Figure 1:
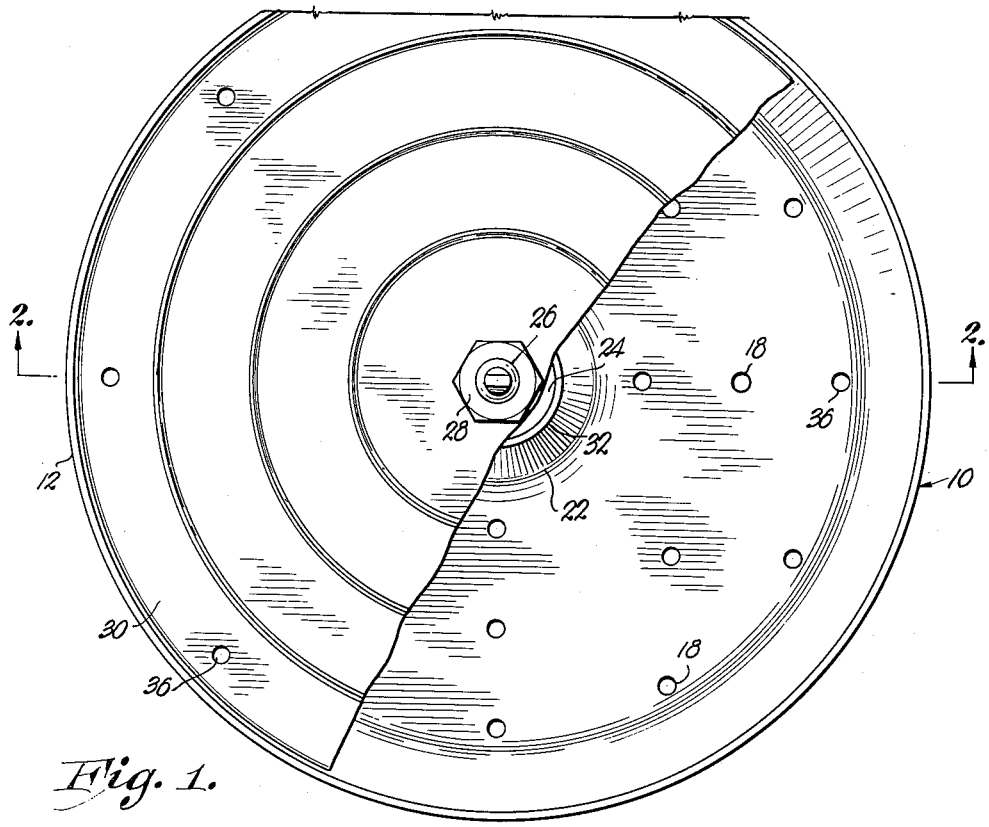

March 6, 1962  H. J. BERTRAM  3,023,533
FISH ATTRACTOR
Filed March 6, 1961

INVENTOR.
Henry J. Bertram
BY
Hovey, Schmidt, Johnson & Hovey
ATTORNEYS.

3,023,533
FISH ATTRACTOR
Henry J. Bertram, 5126 Walrond, Kansas City, Mo.
Filed Mar. 6, 1961, Ser. No. 93,785
7 Claims. (Cl. 43—41)

This invention relates to a decoy for fish adapted to lure fish into an area in which a fisherman desires to fish, thereby increasing the probability of success in the catch.

The primary object of this invention is to provide an aid to fishing in the nature of a transparent container for live fish or the like, and having means to assure a sufficient flow of water therethrough to keep such bait alive.

One important object of this invention is to provide a fish attractor which may be immersed in the fishing water to varying depths.

Another important object of the instant invention is to provide a container which is designed to not only allow, but actually cause the live aquatic therein to instinctively move and school freely around the sides thereof, and to prevent such schooling at the central zone of the container.

A further object of the present invention is to provide a fish attractor in the form of a container wherein the presence, schooling and movement of the life therein will be observable to and, hence, attractive to larger fish outside of said container, whereby the larger fish will be attracted to the vicinity of the container, whereupon the fisherman may drop his baited hook in the area where the fish have collected.

A still further object of this invention is to provide a fish attractor with means whereby a line of variable length may be fastened to the attractor, thus allowing the attractor to be retrievably stationed at a location suiting the desires of the fisherman.

Other objects will appear during the course of the specification.

Figure 2:
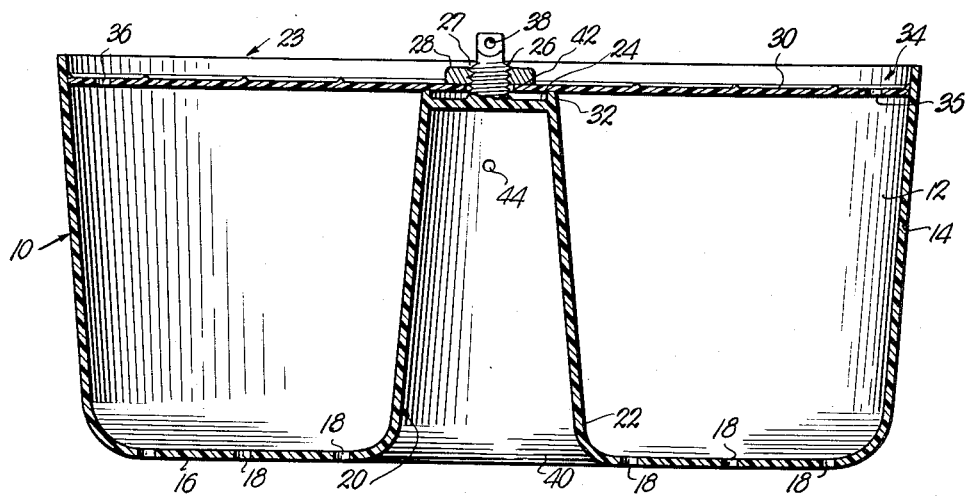

Referring to the drawing:

FIGURE 1 is a partial top plan view of the fish attractor, a portion of the lid thereof being broken away; and FIG. 2 is a vertical, sectional view taken along line 2—2 of FIG. 1.

The fish attractor broadly designated 10 comprises a hollow open top body 12 which may be frusto-conical as shown, if desired, with a preferably continuous, circular side wall 14.

Body 12 is provided with a bottom 16 in which are disposed a plurality of openings 18, there being sufficient openings 18 to readily permit the entry of water into the interior of the body 12, yet each opening being small enough to prevent live attraction decoy means from escaping therethrough.

For the most part, minnows will be used in the body 12, exteriorly of a member 20, but any swimming aquatic may be used if desired.

The centrally disposed and upwardly extending member 20 is tubular and preferably frusto-conical with the smaller end adjacent the top of the attractor 10. The member 20 is provided with a continuous, substantially circular, inner wall 22, extending to a point slightly below the level of the upper circular edge 23 of side wall 14. Inner wall 22, along with outer wall 14 and bottom 16, make up the three sides of body 12.

Disposed generally horizontally near upper edge 32 of inner wall 22 in sealing relationship or integral with the latter, is a top wall 24.

Rigidly mounted on the center of top wall 24 and projecting perpendicularly therefrom, is an extension 26. Extension 26 is provided with a threaded surface 27 extending from top wall 24 upwards approximately one-half of the length of extension 26. The threaded surface 27 of extension 26 is adapted to threadably engage a fastener 28. Extension 26 and fastener 28 are adapted to releasably hold a lid 30 onto body 12. The lid 30 is provided with an aperture 42 adapted to receive extension 26 therethrough, allowing lid 30 to be seated upon upper edge 32 of member 20.

Lid 30 is of sufficient diameter and generally shaped so that it will engage side wall 14 when resting on shoulder 32, thereby covering the opening 34 at the top of body 12. The perpendicular distance from shoulder 32 to bottom 16 is sufficient that lid 30 is disposed near the top edge of side wall 14.

Disposed on lid 30 are a plurality of holes 36 which are sufficiently small to prevent the minnows from passing therethrough, yet large enough to allow for passage of air into and out of body 12 with lid 30 in place.

Extension 26 is provided with an aperture 38 above the threaded surface 27. Aperture 38 is large enough to receive a cord, line, or other attaching means so that attractor 10 may be retrievably disposed in the fishing waters.

Bottom 16 of body 12 extends only to inner wall 22. Thus member 20 is provided at the bottom with an opening 40. Wall 22 has an aperture 44 therethrough spaced vertically from wall 24.

Outer wall 14, member 22, and bottom 16 of body 12 are preferably made in one piece of a transparent material, preferably of plastic.

To utilize the fish attractor 10, a fisherman places a number of live minnows or other type of live fishing bait into body 12 of attractor 10. He then places lid 30 in position over extension 26. Fastener 28, in the nature of a nut or the like, is disposed on bolt or extension 26 and tightened against the upper surface of lid 30, thereby pressing lid 30 into seating engagement with shoulder or edge 32. It can readily be seen that body 12 is then entirely enclosed so that the live bait which has been placed therein cannot escape from the confines of body 12.

A fishing line, chain, cord or the like is then secured to extension 26 through aperture 38. Attractor 10 is then lowered into the fishing waters by the fisherman. Since the plastic and bait are heavier than the water, they will tend to sink into the fishing water. Water will flow through openings 18 in bottom 16, allowing attractor 10 to sink into the water and also providing swimming water in body 12 to keep the bait therein in a live and in an active condition. The air displaced by the water entering into body 12 can escape through the holes 36 in lid 30.

The depth to which attractor 10 will sink into the fishing waters will be limited by the flow of water into member 20 through opening 40, trapping air into the upper portion of member 20. The air in the upper portion of member 20 is sealed from escaping therefrom by the inner wall 22 and the top wall 24 of member 20. Since the member 20 is centered in body 12, the buoyancy of attractor 10 will tend to be concentrated toward its center, thereby providing for additional stability to attractor 10 as it floats in fully or semi-immersed condition in the fishing waters.

It may be desirable to have attractor 10 immerse to a depth where top 30 is substantially flush with the level of the fishing waters. Aperture 44 is provided through wall 22 to allow some trapped air to escape from member 20, but is sufficiently spaced below wall 24 to insure that some air will remain trapped in the upper region of member 20. The spacing may be predetermined to permit attractor 10 to submerge to any desired depth.

The live bait within attractor 10 can and will, naturally or instinctively, freely swim within body 12 along the transparent outer wall 14 and above the transparent bottom 16 thereof. Such swimming and movement of the live bait can be readily observable to larger fish within the fishing waters. Upon observing the swimming and movement of the live bait within attractor 10, the larger fish will be attracted to the vicinity of attractor 10 and, accordingly, into the vicinity of the baited fishing hooks. Inasmuch as the fishing hooks will be baited with live bait of a similar type, the larger fish will be induced to take the live bait offered them on the fishing hooks, and thereby the chances of the fisherman successfully to catch the larger fish will be enhanced.

Lid 30 fits tightly in body 12 where it is free from being snagged by the fisherman's hooks. Also, it tends to flex when nut 28 is drawn down tight, thereby tending to hold the latter against becoming loose.

The operation of attractor 10 is enhanced by the member 20 extending vertically through the center thereof. Member 20 not only serves to concentrate the buoyancy of attractor 10 at the center thereof, but also prevents the live bait in body 12 from tending to school in the central zone of the attractor and not school and swim along the transparent wall 14 as is desired. Inasmuch as the live bait is required to swim along such transparent surface, their attractiveness to larger fish is greatly enhanced. Member 22 also serves to support lid 30 and to provide means for cord attachment as aforesaid.

It will be appreciated that the line fastened to extension 26 may be attached to a buoy so that the submerged attractor 10 may be readily located. Further, the line may be tied to a pole, tree limb, boat, dock, anchor or other convenient place and thereby restrict the lure to a particular location.

Having thus described the invention, what is claimed as new and desired to be secured by Letters Patent is:

1. A fish attractor comprising a hollow, open top body adapted to receive live minnows and provided with a removable lid for its open top; and means on the body for attaching a line thereto for lowering the body into fishing waters, said body having openings therein, smaller than the minnows, for admission of water thereinto when so lowered, within which the minnows may swim, and said body being transparent whereby the fish may see the minnows swimming inside the body, said body having an upright member therewithin around which the minnows must swim for preventing their schooling inactively within the central zone of the body, said member being tubular and opening through the bottom of the body for receiving water when the body is lowered, the upper end of the member being closed to present an air trap therewithin and thereby give the body bouyancy in the fishing waters.

2. The invention of claim 1, said bottom being flat, the openings being in said bottom of the body.

3. The invention of claim 2, said body having a continuous, substantially circular, imperforate side wall along which the minnows tend to school and swim without interruption.

4. The invention of claim 3, the member being concentric with the side wall, substantially equal in height therewith, and integral with said bottom, said upper end of the member having an extension passing centrally through the lid and provided with a fastener for releasably holding the lid in place.

5. The invention of claim 4, said line attaching means being on the extension, said lid being flat and resting on the member within the body, the lid and the member being transparent, the side wall tapering inwardly toward the bottom, the member tapering inwardly toward the lid, said lid having a circular periphery engaging the side wall.

6. The invention of claim 1, said member being provided with means for evacuating the same of a portion of the air therein whereby said body sinks to a predetermined depth within said fishing waters.

7. The invention of claim 1, said member being provided with means for evacuating the same of a portion of the air therein whereby said body sinks to a predetermined depth within said fishing waters, and comprising an aperture below the closed end thereof and disposed to maintain the upper extremities of the body substantially coincident with the level of said waters.

References Cited in the file of this patent

UNITED STATES PATENTS

| 2,287,806 | Kamrath | June 30, 1942 |
| 2,842,890 | Goroni | July 15, 1958 |
| 2,963,814 | Zabrocki | Dec. 13, 1960 |

FOREIGN PATENTS

| 24,497 | Great Britain | Nov. 3, 1896 |
| 29,431 | Great Britain | Dec. 31, 1904 |